Aug. 22, 1967   H. D. NEWTON   3,336,677
ADJUSTING GAUGE FOR BORING TOOL
Filed May 5, 1965
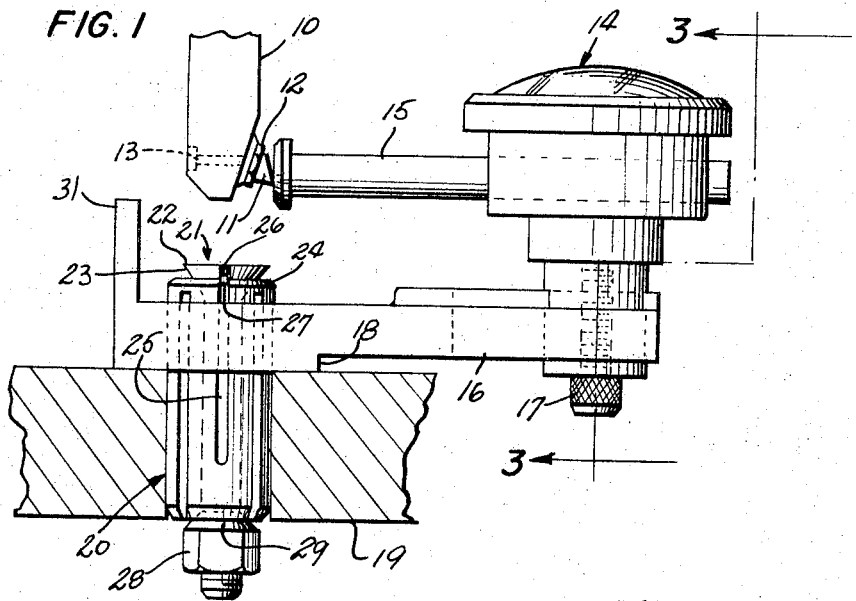
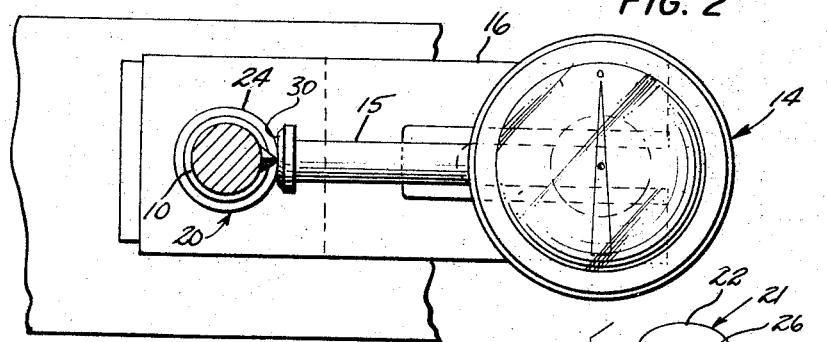
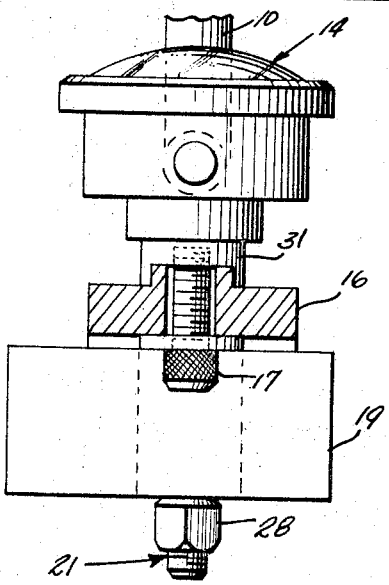
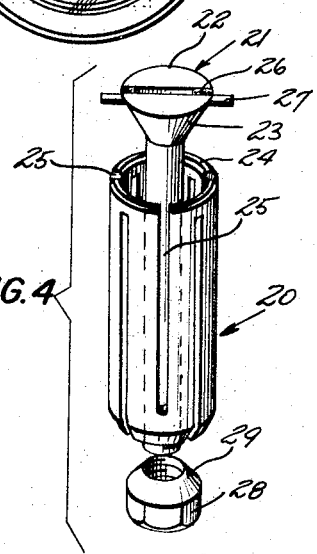
INVENTOR
Howard D. Newton

United States Patent Office 3,336,677
Patented Aug. 22, 1967

3,336,677
ADJUSTING GAUGE FOR BORING TOOL
Howard D. Newton, R.F.D. 2, Farmington, Conn. 06032
Filed May 5, 1965, Ser. No. 453,300
5 Claims. (Cl. 33—185)

This invention relates to machine tools, and particularly, to that machine tool known as a boring tool, and more definitely, to a gauge used to adjust the boring tool.

Machine tool work is generally of the precision type that must be measured and checked with gauges for accuracy at all times as the tools are used to make other tools and/or various instruments, objects, and devices that either manufacture articles of every day use, or are the articles themselves.

One of the most used tools found in nearly every machine shop and/or tool room is the boring tool which, as everyone in the art knows, is used to cut a large opening after a pilot hole has been drilled into the part being worked on. Since most boring tools can be adjusted for the diameter of the opening to be bored, the problem arises in making the adjustment to accurately cut the opening within a plus or minus a half of a ten-thousandth of an inch. This adjusting of the boring tool is, in most places, left to the ability of the man doing the job. Unfortunately, this often leads to considerable loss of time as wall as possible error in the diameter of the opening to be bored in the piece of material at hand. If the part is a special casting, and the error is one of too large an opening, the ruined part and the time lost in obtaining a new part can cost many thousands of dollars.

For this reason, the principal object of this invention is to provide an adjustable gauge for boring tools that will permit anyone having machine shop experience to adjust the boring tool to cut an opening to a predetermined diameter to an accuracy of plus or minus 0.0002 of an inch in a minimum of time and with a minimum of effort.

Another object of this invention is to provide an adjustable gauge for boring tools that can be adapted to support nearly any dial indicator.

Another object of this invention is to provide an adjustable gauge for boring tools that embodies the use of an expanding collet, as will hereinafter be described.

Another object of this invention is to provide an adjustable gauge for boring tools that can be used to accurately set the diameter of any adjustable boring tool after it has been set up and ready to bore an opening in a given piece of material that has already been clamped in place for boring.

Still another object of this invention is to provide an adjustable gauge for boring tools that can be adapted to any piece of work having a flat face in which a bored opening is to be made.

I now accomplish the above noted objects and others which will come to mind as the description of this invention proceeds by means shown in the accompanying drawing in which:

FIGURE 1 is a side view of this invention in position for actual use.

FIGURE 2 is a top view of FIGURE 1.

FIGURE 3 is a vertically disposed partial sectional view of this invention, taken substantially along line 3—3 of FIGURE 1, and viewed in the direction indicated by the arrows.

FIGURE 4 is a pictorial exploded view of the expanding collet portion of this invention and its holding nut and bolt.

FIGURE 1 illustrates a boring tool 10, having a tool bit 11 that is adjustably secured in place by means of the nut 12 and the lockscrew 13. A dial indicator 14, having a horizontally disposed stem 15, is secured in place on the outer end of the steel arm 16 by means of the knurled head adjusting screw 17. The aforesaid arm 16 is provided with a boss 18 on the inner end thereof. The aforesaid boss 18 seats on top of the piece of work 19 that is to have a bored opening placed therethrough by means of the aforesaid boring tool 10. The opening is first made by a drill of smaller diameter than that of the desired bore, as will be understood by those experienced in the machine tool, tool making, and inspection arts. The expanding collet 20 is now slipped down through the aforesaid opening in both the arm 16 and the piece of work 19 and the bolt 21 having a head 22, the periphery 23 of which tapered, as shown in FIGURE 4 of the drawing, is now placed in the aforesaid expanding collet 20 which is not only provided with an internally tapered periphery in the upper end 24 thereof, but also with a pair of diametrically opposite recesses 25 therein. The lower end of the collet is likewise provided with a pair of recesses that are at a right angle to the first mentioned pair of recesses. The aforesaid head 22 of the bolt 21 is provided with horizontally disposed recess 26 in the top surface thereof in which is secured the pin 27. This pin 27 has each end extending outward beyond the periphery of the head in order to fit down into two of the aforesaid recesses 25, as clearly shown in the aforesaid FIGURE 4 of the drawing. The nut 28 is provided with a tapered face 29 that fits into the tapered inner periphery of the lower end of the aforesaid expanding collet 20.

The tightening of the nut 28 on the lower end of the bolt 21 will obviously cause the aforesaid expanding collet 20 to expand until it has the equivalent to a press fit in the opening in both the arm 16 and the piece of work 19 through which the collet has been placed, as one can see by examining FIGURE 1 of the drawing. The collet 20 secures the steel arm 16 in a predetermined and fixed position in relation to the tool bit 11 of the boring tool 10 which is now hand rotated after the aforesaid dial indicator has been set so that the face of its button 30 is in contact with the aforesaid tool bit 11 at the high point of one complete rotation of the boring tool 10. The actual adjustment of the tool bit 11 is done by first loosening the lockscrew 13 and then turning the nut 12.

The vertically disposed extension member 31 is used with size-blocks to master the gauge. The distance from the center line of the expanding collet 20 to the face of the aforesaid extension member 31 would be added to one-half of the desired opening diameter in the piece of work 19. A predetermined size of block having a dimension of this sum would be placed between the aforesaid extension member 31 and the face of the aforesaid button 30 of the dial indicator 14 and the position of the indicator 14 along the slot of arm 16 adjusted to zero the just mentioned indicator. The aforesaid boring tool 10 could then be adjusted to the zero point on the aforesaid dial indicator 14 in order for one to bore the required diameter opening in the aforesaid piece of work 19.

A plurality of expanding collets 20, of different diameters, can be supplied to fit various openings in the piece of work. The collets are interchangeable in the opening in the arm 16. For large openings, a three-spider can be used to centralize the adjusting gauge. In case of a blind opening in the piece of work, the aforesaid bolt 20 can be reversed in the expanding collet 20, which must have a length slightly greater than that of the combined thickness of the arm 14 and the piece of work 19.

It will be understood that while I have here described one form of my invention, I do not wish to limit myself to the exact form shown, but desire to have it taken in a sense illustrative of any and all the forms of the same as will come within the scope of the appended claims.

What I now claim as new and desire to secure by Letters Patent is:

1. An adjusting gauge for a boring tool comprising, a flat arm having an inner end with a transverse bore therethrough and an outer end, a dial indicator gauge mounted on the outer end with the stem of the gauge extending substantially parallel to the arm to a point above the bore, means extending through the bore and into a pilot opening for securing the said arm to the surface of work in which a pilot opening has been made, with the bore over the pilot opening so that the dial indicator may contact a tool bit of a boring tool while the bit is adjusted, which bit may bore the pilot opening to a predetermined diameter after the said adjusting gauge has been removed from the said piece of work.

2. The combination of claim 1 in which the means for securing the arm to the surface of the work comprises an expanding collet extending through the bore in the said arm and to extend on into a pilot opening, and means adapted to be placed in the expanding collet to expand the collet to firmly secure the arm to the work.

3. The combination of claim 1 in which the means for securing the arm to the surface of the work comprises an expanding collet extending through the bore in said arm and to extend into a pilot opening, a bolt extending through said expanding collet, said bolt having tapered portions to expand the collet to firmly secure the said arm to a piece of work.

4. The combination of claim 1 in which the means for securing the arm to the surface of work comprises an expanding collet having a pair of diametrically opposite recesses therein extending downward from one end thereof, an alike pair of recesses at right angle thereto extending upward from the other end thereof, and a bolt having tapering surfaces extending through said collet to expand the collet and firmly secure it in said bore and in a pilot opening.

5. The combination of claim 1 in which the means for securing the arm to the surface of the work comprises an expanding collet having a pair of diametrically opposite recesses therein extending downward from one end thereof, an alike pair of recesses at right angle thereto extending upward from the other end thereof, each end of said expanding collet having an internal taper therein, the expanding collet extending through the bore in the said arm and to extend into a pilot opening, a bolt having a tapered peripheral head in the upper surface of which is located a horizontally disposed recess in which is secured a pin whose length is equal to the external diameter of the said expanding collet in which the bolt is placed, the said pin fitting into two of the recesses in the said collet, and a nut having a tapered face secured to the other end of the said bolt and fitting into the other end of said expanding collet.

References Cited
UNITED STATES PATENTS

| | | | |
|---|---|---|---|
| 1,198,201 | 9/1916 | Dougherty | 33—185 |
| 2,482,783 | 9/1949 | Longworth et al. | 33—174 |
| 2,513,345 | 7/1950 | Mealey | 33—185 |
| 2,571,853 | 10/1951 | Fontecchio | 33—185 X |
| 2,766,532 | 10/1956 | Eisele | 33—174 |
| 2,775,821 | 1/1957 | Eipper | 33—185 |
| 2,886,896 | 5/1959 | Humphreville | 33—185 |

LEONARD FORMAN, *Primary Examiner.*

S. S. MATTHEWS, *Assistant Examiner.*